United States Patent
Ito et al.

(10) Patent No.: US 11,293,364 B2
(45) Date of Patent: Apr. 5, 2022

(54) CONTROL DEVICE FOR DRIVE SYSTEM

(71) Applicant: TOYOTA JIDOSHA KABUSHIKI KAISHA, Toyota (JP)

(72) Inventors: Koji Ito, Nagoya (JP); Kazuhiko Sakakibara, Toyota (JP); Hiroyuki Toyama, Toyota (JP); Michihiro Miyashita, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 134 days.

(21) Appl. No.: 16/816,755

(22) Filed: Mar. 12, 2020

(65) Prior Publication Data
US 2020/0332734 A1   Oct. 22, 2020

(30) Foreign Application Priority Data

Apr. 19, 2019   (JP) .............................. JP2019-080150

(51) Int. Cl.
| | |
|---|---|
| *F02D 41/06* | (2006.01) |
| *F02B 63/04* | (2006.01) |
| *F02N 11/08* | (2006.01) |
| *B60W 20/13* | (2016.01) |

(52) U.S. Cl.
CPC ........... *F02D 41/062* (2013.01); *B60W 20/13* (2016.01); *F02B 63/042* (2013.01); *F02N 11/0814* (2013.01); *F02N 11/0862* (2013.01); *F02N 11/0825* (2013.01); *F02N 2200/063* (2013.01)

(58) Field of Classification Search
CPC ...... B60W 20/13; F02D 41/06; F02D 41/062; F02D 41/065; F02N 11/0814; F02N 11/0818; F02N 11/0825; F02N 11/0862

USPC ........................... 123/179.3, 179.4; 701/113
See application file for complete search history.

(56) References Cited

U.S. PATENT DOCUMENTS

| | | | | |
|---|---|---|---|---|
| 6,316,842 | B1* | 11/2001 | Kuroda ................. | B60K 6/543 290/40 C |
| 6,702,052 | B1* | 3/2004 | Wakashiro ............ | B60W 10/08 180/65.25 |
| 2009/0115419 | A1* | 5/2009 | Ueda .................... | F02N 11/0825 324/430 |
| 2010/0217484 | A1* | 8/2010 | Mizuno ............... | F02N 11/0818 701/36 |
| 2010/0269776 | A1* | 10/2010 | Mizuno ............... | F02N 11/0825 123/179.4 |

(Continued)

FOREIGN PATENT DOCUMENTS

JP        2009-241633 A      10/2009

*Primary Examiner* — Robert A Werner
(74) *Attorney, Agent, or Firm* — Sughrue Mion, PLLC (57) ABSTRACT

A drive system includes an engine as a drive source, a lead storage battery that is charged using the engine as a motive power source, a starter that starts up the engine by being driven by electric power from the lead storage battery, and a battery sensor that measures an inter-terminal voltage of the lead storage battery. A control device that is applied to the drive system temporarily stops the engine when a temporary stop condition is satisfied, and starts up the engine again when a discharge amount of the lead storage battery in a period of the temporary stop is larger than a discharge upper limit amount. When an inrush voltage is equal to or lower than a restraint threshold, the discharge upper limit amount is set so as to be smaller than when the inrush voltage is higher than the restraint threshold.

5 Claims, 3 Drawing Sheets

(56) References Cited

U.S. PATENT DOCUMENTS

| | | | | |
|---|---|---|---|---|
| 2011/0231122 A1* | 9/2011 | Fabregas | .............. | G01R 31/378 |
| | | | | 702/63 |
| 2014/0365099 A1* | 12/2014 | Tochigi | .................. | F02D 17/04 |
| | | | | 701/99 |
| 2016/0272210 A1* | 9/2016 | Matsushita | ..... | B60W 30/18018 |

* cited by examiner

CONTROL DEVICE FOR DRIVE SYSTEM

INCORPORATION BY REFERENCE

The disclosure of Japanese Patent Application No. 2019-080150 filed on Apr. 19, 2019 including the specification, drawings and abstract is incorporated herein by reference in its entirety.

BACKGROUND

1. Technical Field

The disclosure relates to a control device that is applied to a drive system for a vehicle.

2. Description of Related Art

A battery state detection system described in Japanese Patent Application Publication No. 2009-241633 (JP 2009-241633 A) is equipped in a vehicle having a temporary stop function of an engine, that is, a so-called stop-start function. In the battery state detection system, an inter-terminal voltage of a lead storage battery is measured. Then, the internal resistance of the lead storage battery is calculated based on the inter-terminal voltage of the lead storage battery, and the remaining capacity of the lead storage battery is estimated based on the internal resistance.

SUMMARY

Figure 5:
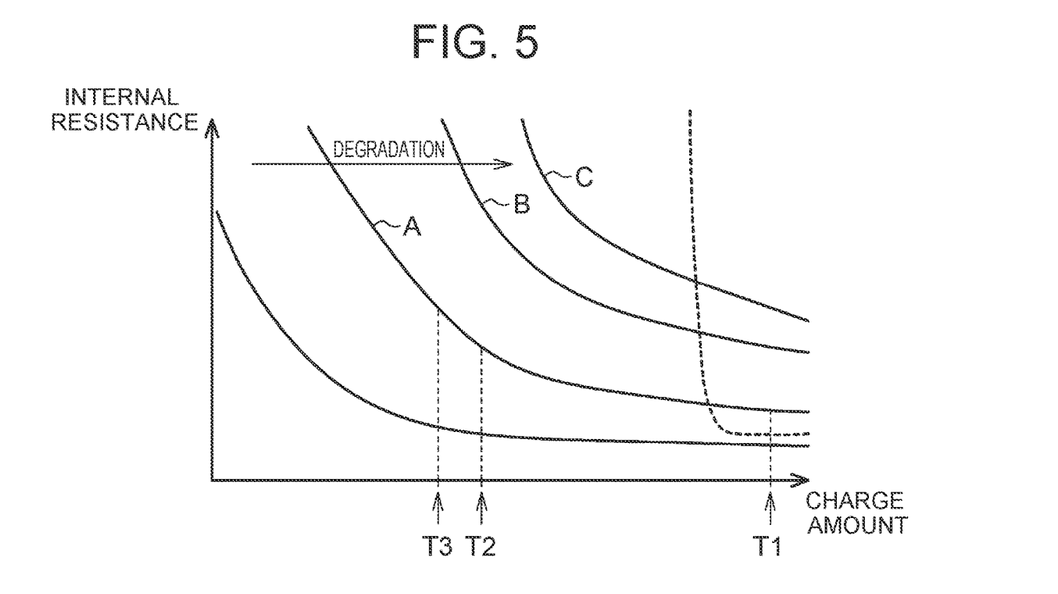
FIG. 5 is a graph showing a relation between charge amount and internal resistance.

Generally, as shown by solid lines in FIG. 5, when the remaining capacity of the battery is small due to degradation of the battery or discharge of the battery, the internal resistance of the battery increases. Then, the increase in the internal resistance decreases a starter drive performance of the battery.

In the battery state detection system described in JP 2009-241633 A, the remaining capacity of the battery is estimated based on the inter-terminal voltage of the battery. Then, when a sufficient capacity is secured as the estimated remaining capacity, the temporary stop of the engine is permitted.

However, in the above technology, if a corresponding capacity is not secured as the remaining capacity of the battery, the temporary stop of the engine is not performed, and therefore, there is concern that an opportunity of the temporary stop of the engine is lost. On the other hand, if the temporary stop of the engine is permitted when the remaining capacity of the battery is small, electric power is consumed by an electric-power auxiliary machine that is being driven during the temporary stop of the engine, so that there is concern of an over discharge of the battery.

For solving the above problem, the disclosure is a control device that is applied to a drive system for a vehicle, the drive system including an engine as a drive source, a battery that is charged using the engine as a motive power source, a starter that starts up the engine by being driven by electric power from the battery, and a voltage sensor that measures the voltage of the battery, the control device including: a start-up voltage acquisition unit that acquires, as a battery start-up voltage, the voltage measured by the voltage sensor when the starter is driven; and an engine control unit that temporarily stops the engine when a preset temporary stop condition is satisfied in a state where the engine is being driven, in which the engine control unit starts up the engine again when a discharge amount of the battery in a period of the temporary stop of the engine is larger than a discharge upper limit amount, and when the battery start-up voltage is equal to or lower than a preset threshold, the discharge upper limit amount is set so as to be smaller than when the battery start-up voltage is higher than the threshold.

With the above configuration, the starter is driven at the time of the start-up of the engine, and the consumed electric power of an electric-powered auxiliary machine other than the starter is likely to be nearly constant. Even if the consumed electric power of the electric-powered auxiliary machine other than the starter differs, the difference is correspondingly small compared to the consumed electric power of the starter. Accordingly, by comparing the battery start-up voltage when the starter is driven to the threshold, it is possible to eliminate influence of the consumed electric power of the electric-powered auxiliary machine, and the like, and to appropriately determine the internal resistance of the battery. Then, when the internal resistance of the battery is high, the discharge upper limit amount is set so as to be small, so that the period of the temporary stop of the engine becomes relatively short. Accordingly, it is possible to secure an opportunity of the temporary stop of the engine, and therewith to restrain an over discharge of the battery due to the temporary stop of the engine.

In the above control device, the engine control unit may set the discharge upper limit amount, such that the discharge upper limit amount is smaller as the battery start-up voltage is lower relative to the threshold. With the above configuration, as the dischargeable capacity of the battery is smaller, the discharge upper limit amount of the battery is set so as to be smaller, and the period of the temporary stop of the engine becomes shorter. In this way, it is possible to change the limit of the discharge of the battery, depending on the internal resistance of the battery.

In the above control device, the engine control unit may prohibit the temporary stop of the engine, when the battery start-up voltage is equal to or lower than a preset prohibition threshold that is a value lower than the threshold. With the above configuration, when the internal resistance of the battery is high due to degradation of the battery or insufficiency of charge, the drive of the engine is continued, and the battery is charged.

In the above control device, the drive system may include a current sensor that measures a charge-discharge current of the battery, and the engine control unit may set the discharge upper limit amount, such that the discharge upper limit amount is smaller as an integrated value of the charge-discharge current measured by the current sensor after completion of the start-up of the engine by the drive of the starter and before the temporary stop of the engine is greater to a discharge side.

With the above configuration, the dischargeable capacity of the battery during the temporary stop is larger as the charge-discharge current of the battery during the drive of the engine is greater to a charge side. Meanwhile, the dischargeable capacity of the battery during the temporary stop is smaller as the charge-discharge current of the battery during the drive of the engine is greater to the discharge side. Therefore, the period of the temporary stop of the engine is appropriately managed, so as to reflect the charge-discharge capacity of the battery during the drive of the engine.

For solving the above problem, the disclosure is a control device that is applied to a drive system for a vehicle, the drive system including an engine as a drive source, a battery that is charged using the engine as a motive power source, a starter that starts up the engine by being driven by electric power from the battery, and a voltage sensor that measures the voltage of the battery, the control device including: a start-up voltage difference acquisition unit that acquires a voltage difference that is a difference between a first battery start-up voltage and a second battery start-up voltage, the first battery start-up voltage being measured by the voltage sensor when the starter is driven, the second battery start-up voltage being measured by the voltage sensor when the starter is driven at a different timing from a timing when the first battery start-up voltage is measured; and an engine control unit that temporarily stops the engine when a preset temporary stop condition is satisfied in a state where the engine is being driven, in which the engine control unit starts up the engine again when a discharge amount of the battery in a period of the temporary stop of the engine is larger than a discharge upper limit amount, and when the voltage difference is equal to or larger than a preset specified value, the discharge upper limit amount is set so as to be smaller than when the voltage difference is smaller than the specified value.

With the above configuration, the starter is driven at the time of the start-up of the engine, and the consumed electric power of an electric-powered auxiliary machine other than the starter is likely to be nearly constant. Even if the consumed electric power of the electric-powered auxiliary machine other than the starter differs, the difference is correspondingly small compared to the consumed electric power of the starter. Accordingly, by comparing the battery start-up voltages when the starter is driven, it is possible to eliminate influence of the consumed electric power of the electric-powered auxiliary machine, and the like, and to appropriately determine a degradation state of the battery. Then, when the remaining capacity of the battery is small due to the degradation of the battery, the discharge upper limit amount is set so as to be small, so that the period of the temporary stop of the engine becomes relatively short. Accordingly, it is possible to secure an opportunity of the temporary stop of the engine, and therewith to restrain the over discharge of the battery due to the temporary stop of the engine.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
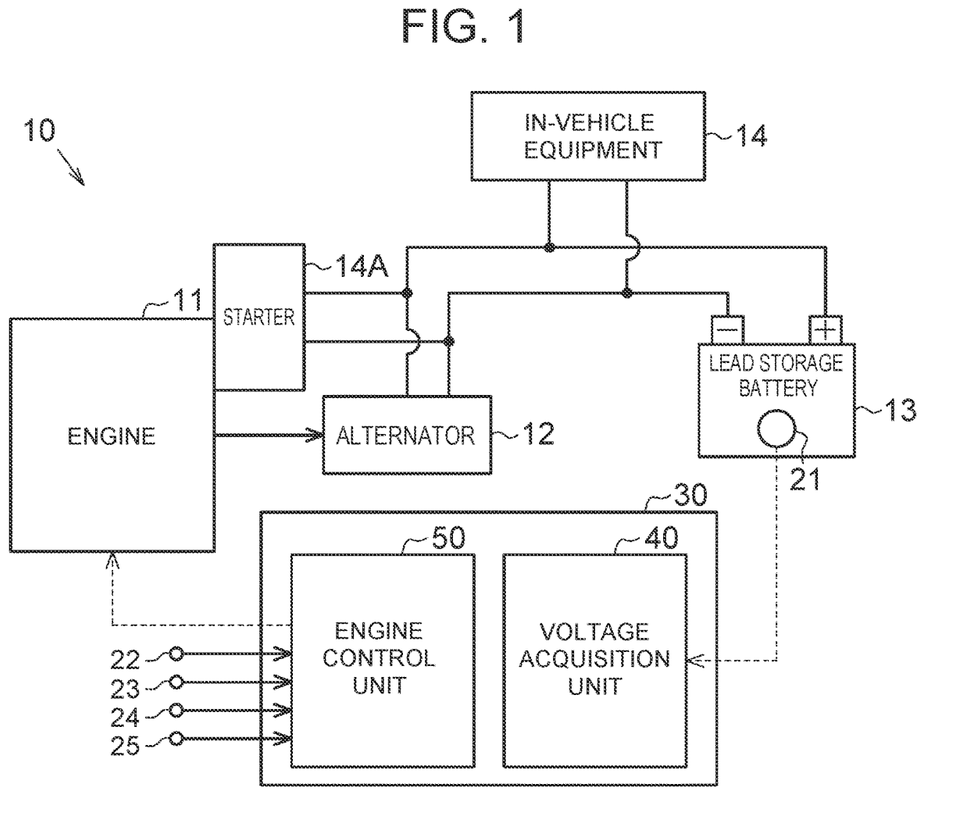
FIG. 1 is a schematic diagram of a drive system.

Hereinafter, an embodiment of a control device that is applied to a drive system for a vehicle will be described with reference to the drawings. First, a whole configuration of the drive system will be described. As shown in FIG. 1, a drive system 10 includes an engine 11 as a drove source of a vehicle. The engine 11 is coupled with an alternator 12 so as to drive the alternator 12. The alternator 12 generates electricity by being driven based on drive torque that is output from the engine 11.

The alternator 12 is electrically connected with a lead storage battery 13 that is charged by electric power generated by the alternator 12. That is, the lead storage battery 13 functions as a battery that is charged using the engine 11 as a drive source. To the lead storage battery 13, a battery sensor 21 is attached. The battery sensor 21 detects the voltage, current and temperature between terminals of the lead storage battery 13. That is, the battery sensor 21 functions as a voltage sensor and a current sensor.

The lead storage battery 13 is electrically connected with in-vehicle equipment 14 that is driven by supply of electric power from the lead storage battery 13. Examples of the in-vehicle equipment 14 include electric-powered auxiliary machines such as an audio device and an air conditioner that are equipped in the vehicle. Further, the lead storage battery 13 is electrically connected with a starter 14A that starts up the engine 11, as one of the in-vehicle equipment 14. The starter 14A is attached to the engine 11, and when the starter 14A is driven by the electric power from the lead storage battery 13, the engine 11 is started up.

The vehicle includes a control device 30 that is applied to the drive system 10. The control device 30 includes a voltage acquisition unit 40 that acquires the voltage of the lead storage battery 13 based on various signals, and an engine control unit 50 that controls the start-up and stop of the engine 11.

The voltage acquisition unit 40 of the control device 30 receives a signal indicating an inter-terminal voltage V of the lead storage battery 13, from the battery sensor 21. Then, the voltage acquisition unit 40 acquires an inrush voltage VS when the engine 11 is started up. In the embodiment, the inrush voltage VS functions as a battery start-up voltage.

Figure 2:
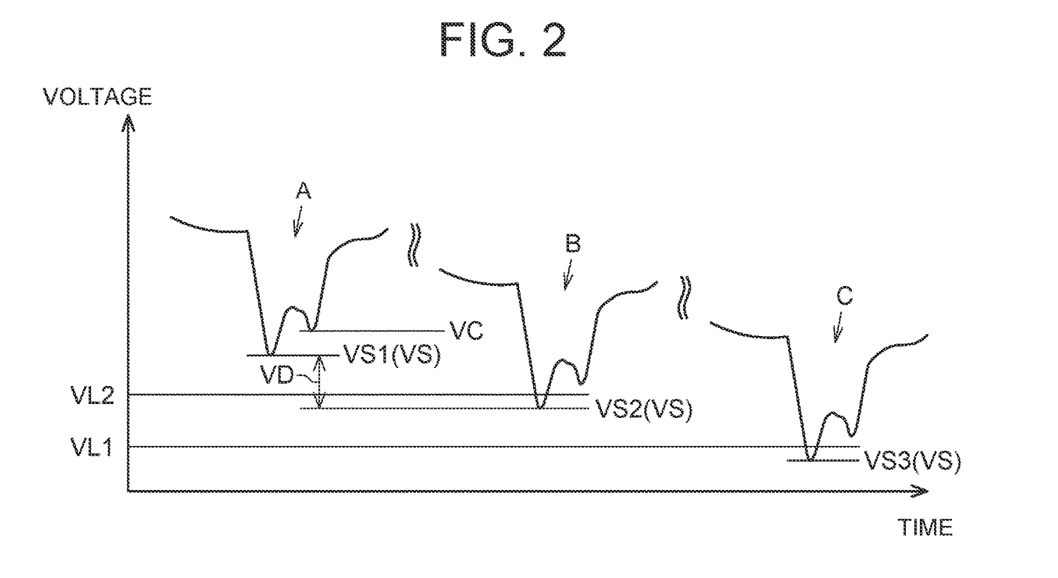
FIG. 2 is a graph showing a change in an inter-terminal voltage of a battery when a starter is driven.

When the engine control unit 50 starts up the engine 11, the starter 14A is driven by the electric power from the lead storage battery 13. On this occasion, as shown in FIG. 2, a relatively high current flows, and thereby a relatively great drop occurs in the inter-terminal voltage V of the lead storage battery 13. In the embodiment, the inrush voltage VS is the lowest inter-terminal voltage V of the lead storage battery 13 when the starter 14A is driven.

As shown in FIG. 1, the engine control unit 50 of the control device 30 receives information indicating the operation amount of an accelerator pedal, from an accelerator pedal sensor 22 that detects the operation amount of the accelerator pedal. Further, the engine control unit 50 receives information indicating a vehicle speed that is the traveling speed of the vehicle, from a vehicle speed sensor 23 that detects the vehicle speed. Furthermore, the engine control unit 50 receives information indicating whether a brake pedal is being operated, from a brake pedal sensor 24 that detects whether the brake pedal is being operated. Further, the engine control unit 50 receives a signal indicating an on-state or off-state of an ignition switch 25 that is used when the stopped engine 11 is driven.

When a preset execution condition is satisfied in a state where the engine 11 is being driven, the engine control unit 50 temporarily stops the engine 11 that is being driven. For example, the execution condition of the temporary stop of the engine 11 is satisfaction of all of a condition that the operation amount of the accelerator pedal is zero, a condition that the vehicle speed is zero, and a condition that the brake pedal is being operated. When the execution condition is satisfied, the engine control unit 50 temporarily stops the engine 11, and when the satisfaction of the execution condition is terminated during the temporary stop of the engine 11, the engine control unit 50 starts up the engine 11 again by driving the starter 14A.

The engine control unit 50 calculates a charge amount SOC of the lead storage battery 13, based on the inter-terminal voltage V, current and temperature of the lead storage battery 13 that are input to the control device 30. In the embodiment, the charge amount SOC is the amount of electricity that can be discharged by the lead storage battery 13, and is also referred to the remaining capacity. That is, in the case of a full charge, the charge amount SOC when the lead storage battery is degraded is smaller than the charge amount SOC when the lead storage battery is not degraded. For convenience of description, FIG. 5 illustrates characteristics of batteries having different states, in which the full charge is shown on the extreme right. Accordingly, the charge amount SOC in the full charge state varies among batteries having different states.

As shown in FIG. 1, the engine control unit 50 calculates an integrated value of a charge-discharge current, by integrating the charge-discharge current measured by the battery sensor 21 after completion of the start-up of the engine 11 by the drive of the starter 14A and before the temporary stop of the engine 11.

Figure 4:
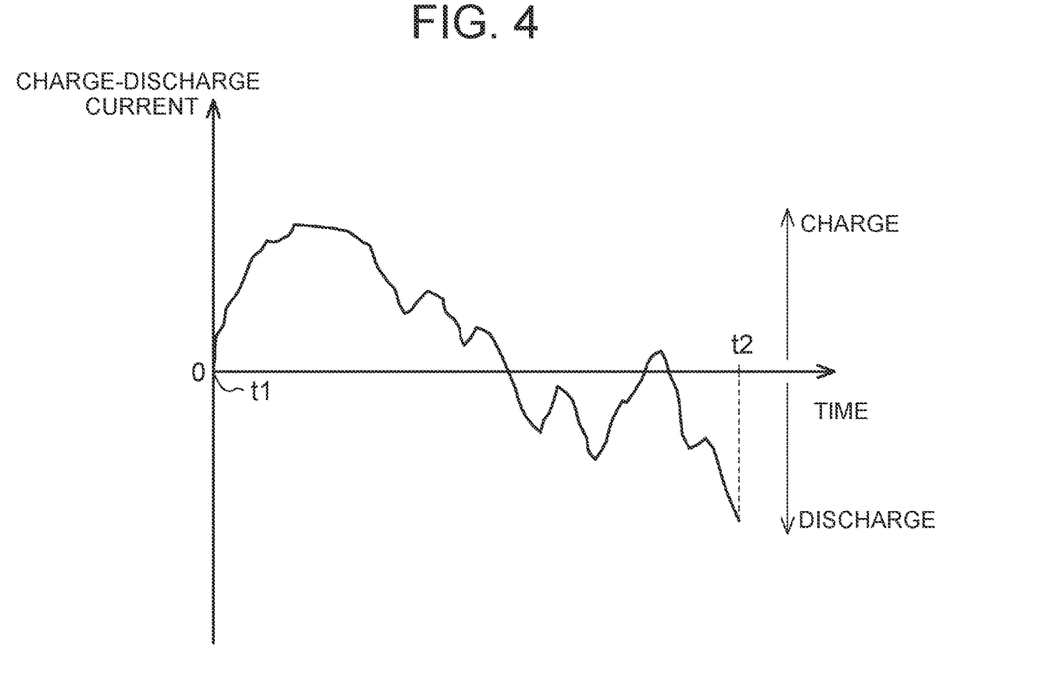
FIG. 4 is a graph showing a change in current that flows through the battery during temporary stop of the engine.

For example, after the timing of the completion of the start-up of the engine 11 and before the timing of the temporary stop of the engine 11, the engine 11 is being driven, and therefore the lead storage battery 13 is charged. Meanwhile, the electric power of the lead storage battery 13 is consumed by the in-vehicle equipment 14. In the case where the electric power for the charge due to the drive of the engine 11 is greater than the electric power for the consumption by the in-vehicle equipment 14, the lead storage battery 13 is charged as a whole, so that the integrated value of the charge-discharge current gradually increases. In the example shown in FIG. 4, the electric power for the charge of the lead storage battery 13 is greater for a while after a timing t1 of the completion of the start-up of the engine 11. In the case where the electric power for the consumption by the in-vehicle equipment 14 is greater than the electric power for the charge due to the drive of the engine 11, the lead storage battery 13 is discharged as a whole, so that the integrated value of the charge-discharge current gradually decreases. In the example shown in FIG. 4, the electric power for the consumption is greater in a period just before a timing t2 of the temporary stop of the engine 11. In this way, in the embodiment, the charge-discharge current is handled, while the charge side is regarded as a "positive" side and the discharge side is regarded as a "negative" side. Then, the integrated current value is evaluated as an integral value in the graph shown in FIG. 4.

Figure 3:
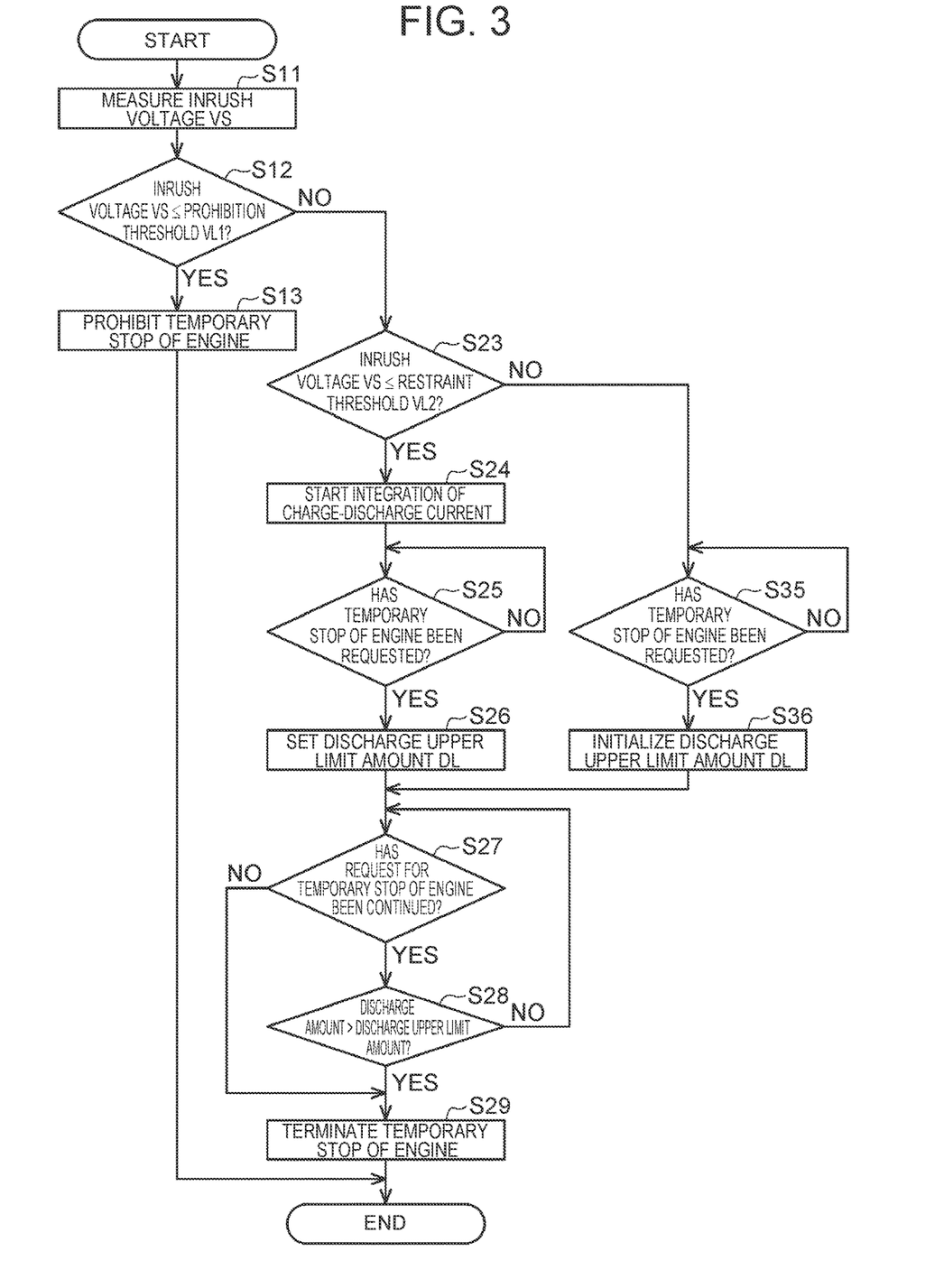
FIG. 3 is a flowchart relevant to a temporary stop process of an engine.

Next, a temporary stop process for the engine 11 that is performed by the control device 30 will be described. When the drive of the starter 14A for the engine 11 is requested, the control device 30 starts the temporary stop process for the engine 11.

As shown in FIG. 3, in step S11, the voltage acquisition unit 40 of the control device 30 acquires the inrush voltage VS when the starter 14A is driven. In the embodiment, the inrush voltage VS functions as the battery start-up voltage. Thereafter, the control device 30 advances the process to step S12.

In step S12, the engine control unit 50 of the control device 30 determines whether the inrush voltage VS acquired by the voltage acquisition unit 40 is equal to or lower than a preset prohibition threshold VL1. By a test or a simulation, the prohibition threshold VL1 can be set as described below. That is, a charge amount SOC of the lead storage battery 13 at which an over discharge can occur when the in-vehicle equipment 14 including the starter 14A consumes the electric power during the temporary stop of the engine 11 or at the time of the subsequent restart is set. Then, a value of the internal resistance corresponding to the set charge amount SOC is evaluated from a relationship between the charge amount SOC and the internal resistance shown in FIG. 5. Then, a value of the inter-terminal voltage of the lead storage battery 13 at the evaluated internal resistance can be set as the prohibition threshold VL1. In the case where it is determined that the inrush voltage VS is equal to or lower than the prohibition threshold VL1 (S12: YES), the engine control unit 50 advances the process to step S13.

In step S13, the engine control unit 50 prohibits the temporary stop of the engine 11. In this case, even when the execution condition of the temporary stop of the engine 11 is satisfied in a state where the engine 11 is being driven, the temporary stop of the engine 11 is not performed. Thereafter, the control device 30 ends the current temporary stop process.

On the other hand, in the case where it is determined in step S12 that the inrush voltage VS is higher than the prohibition threshold VL1 (S12: NO), the engine control unit 50 advances the process to step S23. In step S23, the engine control unit 50 determines whether the inrush voltage VS acquired by the voltage acquisition unit 40 is equal to or lower than a preset restraint threshold VL2. The restraint threshold VL2 is set to a value that is higher than the above-described prohibition threshold VL1. In the embodiment, the restraint threshold VL2 functions as a threshold that is a reference for whether a later-described discharge upper limit amount DL is set to a small value. In the case where it is determined that the inrush voltage VS is equal to or lower than the restraint threshold VL2 (S23: YES), the engine control unit 50 advances the process to step S24.

In step S24, when the engine 11 completes the start-up by the drive of the starter 14A, the engine control unit 50 starts the integration of the charge-discharge current in the lead storage battery 13. Thereafter, the engine control unit 50 advances the process to step S25.

In step S25, the engine control unit 50 determines whether the temporary stop of the engine 11 has been requested. Specifically, the engine control unit 50 determines whether all of the condition that the operation amount of the accelerator pedal is zero, the condition that the vehicle speed is zero and the condition that the brake pedal is being operated are satisfied. When at least one of the conditions is not satisfied, it is determined that the temporary stop of the engine 11 has not been requested. On the other hand, when all conditions are satisfied, it is determined that the temporary stop of the engine 11 has been requested. In the case where it is determined in step S25 that the temporary stop of the engine 11 has not been requested (S25: NO), the engine control unit 50 repeats the process of step S25. On the other hand, in the case where it is determined that the temporary stop of the engine 11 has been requested (S25: YES), the engine control unit 50 advances the process to step S26.

In step S26, the engine control unit 50 sets the discharge upper limit amount DL of the lead storage battery 13. Specifically, first, the engine control unit 50 temporarily stops the engine 11. Next, at the time of the temporary stop of the engine 11, the engine control unit 50 terminates the integration of the charge-discharge current of the lead storage battery 13. Then, the engine control unit 50 calculates the integrated current value of the charge-discharge current of the lead storage battery 13 after the completion of the start-up of the engine 11 by the drive of the starter 14A and before the temporary stop of the engine 11. Next, the engine control unit 50 calculates the discharge upper limit amount DL of the lead storage battery 13, by applying the temperature of the lead storage battery 13 that is detected by the battery sensor 21, the calculated integrated current value and the inrush voltage VS to a map that is previously set by a test or the like.

The discharge upper limit amount DL is calculated so as to be smaller as the integrated current value is greater to the discharge side. That is, the discharge upper limit amount DL is calculated so as to be smaller as the integrated current value is smaller. Further, the discharge upper limit amount DL is calculated so as to be smaller as the inrush voltage VS is lower. Furthermore, the discharge upper limit amount DL is calculated so as to be smaller as the temperature of the lead storage battery 13 is lower. Then, the engine control unit 50 sets the calculated discharge upper limit amount DL, as the upper limit of the discharge amount during the temporary stop of the engine 11. The discharge upper limit amount DL is calculated to a value that is smaller than a later-described specified upper limit amount PL. Accordingly, in the case where the inrush voltage VS is equal to or lower than the restraint threshold VL2 and is higher than the prohibition threshold VL1, the period of the temporary stop of the engine 11 is reduced as the inrush voltage VS of the lead storage battery 13 is lower. Thereafter, the engine control unit 50 advances the process to step S27.

In step S27, the engine control unit 50 determines whether the request for the temporary stop of the engine 11 has been continued. Specifically, the engine control unit 50 determines whether all of the condition that the operation amount of the accelerator pedal is zero, the condition that the vehicle speed is zero and the condition that the brake pedal is being operated are satisfied. In the case where at least one of the conditions is not satisfied and it is determined that the request for the temporary stop of the engine 11 has not been continued (S27: NO), the engine control unit 50 advances the process to a later-described step S29. On the other hand, in the case where the execution condition of the temporary stop of the engine 11 is satisfied and it is determined that the request for the temporary stop of the engine 11 has been continued (S27: YES), the engine control unit 50 advances the process to step S28.

In step S28, the engine control unit 50 determines whether the discharge amount of the lead storage battery 13 is exceeding the discharge upper limit amount DL. In the case where it is determined that the discharge amount of the lead storage battery 13 is equal to or lower than the discharge upper limit amount DL (S28: NO), the engine control unit 50 returns the process to step S27. On the other hand, in the case where it is determined that the discharge amount of the lead storage battery 13 is larger than the discharge upper limit amount DL (S28: YES), the engine control unit 50 advances the process to step S29.

In step S29, the engine control unit 50 terminates the temporary stop of the engine 11. That is, the engine control unit 50 starts up the engine 11 again. Thereafter, the engine control unit 50 ends the current temporary stop process. When the engine 11 is started up again in step S29, the starter 14A is driven. Due to the drive of the starter 14A, the temporary stop process in the next cycle is started.

In the case where it is determined in the above-described step S23 that the inrush voltage VS is higher than the restraint threshold VL2 (S23: NO), the engine control unit 50 advances the process to step S35. In step S35, the engine control unit 50 determines whether the temporary stop of the engine 11 has been requested. Specifically, the engine control unit 50 determines whether all of the condition that the operation amount of the accelerator pedal is zero, the condition that the vehicle speed is zero and the condition that the brake pedal is being operated are satisfied. In the case where at least one of the conditions is not satisfied and it is determined that the temporary stop of the engine 11 has not been requested (S35: NO), the engine control unit 50 repeats the process of step S35. On the other hand, in the case where the execution condition of the temporary condition of the engine 11 is satisfied and it is determined that the temporary stop of the engine 11 has been requested (S35: YES), the engine control unit 50 advances the process to step S36.

In step S36, the engine control unit 50 initializes the discharge upper limit amount DL of the lead storage battery 13. Specifically, the engine control unit 50 sets the discharge upper limit amount DL to the specified upper limit amount PL that is previously set based on the type of the lead storage battery 13, and the like. The specified upper limit amount PL is calculated, as a charge amount SOC necessary to secure a certain charge amount SOC as the charge amount SOC of the lead storage battery 13 even after the engine 11 is started up again. Thereafter, the engine control unit 50 advances the process to step S27. The processes of step 27 to step S29 have been described above.

When the ignition switch 25 is turned off in the middle of the above sequence of the temporary stop process, the engine control unit 50 terminates the temporary stop process, in any step of the temporary stop process for the engine 11.

Next, the operation of the embodiment will be described. In the following description, as shown in FIG. 2, it is assumed that the internal resistance of the lead storage battery 13 increases and the inter-terminal voltage V of the lead storage battery 13 decreases when the degradation proceeds to a state A, a state B and a state C, which are different in the degree of the degradation. For example, suppose that the engine 11 is started up when the lead storage battery 13 is in a nearly full charge state, that is, at timing T1 in FIG. 5.

As shown in FIG. 2, in the state A in which the degree of the degradation of the lead storage battery 13 is low, an inrush voltage VS1 when the engine 11 is started up is higher than the prohibition threshold VL1 and the restraint threshold VL2. In this case, the engine control unit 50 neither prohibits nor restrains the temporary stop of the engine 11, in the temporary stop process of the engine 11.

In the state B in which the degree of the degradation of the lead storage battery 13 is higher than that in the state A, an inrush voltage VS2 when the engine 11 is started up is equal to or lower than the restraint threshold VL2, but is higher than the prohibition threshold VL1. In this case, the engine control unit 50 does not prohibit the temporary stop of the engine 11, but restrains the temporary stop of the engine 11 depending on the discharge amount of the lead storage battery 13, in the temporary stop process of the engine 11.

In the state C in which the degree of the degradation of the lead storage battery 13 is higher than that in the state B, an inrush voltage VS3 when the engine 11 is started up is equal to or lower than the prohibition threshold VL1. In this case, the engine control unit 50 prohibits the temporary stop of the engine 11, in the temporary stop process of the engine 11.

Next, as shown in FIG. 5, descriptions will be made assuming that, in the lead storage battery 13 in the state A in which the degree of the degradation is low, the discharge amount of the lead storage battery 13 increases and the charge amount SOC decreases with elapse of time from timing T1 to timing T3.

Suppose that the starter 14A is driven at timing T1 when the charge amount SOC of the lead storage battery 13 is a nearly full charge amount. At this time, as shown in FIG. 5, the internal resistance of the lead storage battery 13 in the state A in which the degree of the degradation is low is correspondingly low. Accordingly, as shown in FIG. 2, the inrush voltage VS1 when the engine 11 is started up at timing T1 is higher than the prohibition threshold VL1 and the restraint threshold VL2. In this case, the engine control unit 50 neither prohibits nor restrains the temporary stop of the engine 11, in the temporary stop process of the engine 11.

Suppose that the starter 14A is driven thereafter at timing T2 when the lead storage battery 13 is discharged to some extent, as shown in FIG. 5. At this time, the internal resistance of the lead storage battery 13 in the state A is higher than that at the time of the nearly full charge, but remains low. Accordingly, as shown in FIG. 2, the inrush voltage VS2 when the engine 11 is started up at timing T2 is equal to or lower than the restraint threshold VL2, but is higher than the prohibition threshold VL1. In this case, in the temporary stop process of the engine 11, the engine control unit 50 does not prohibit the temporary stop of the engine 11, but restrains the temporary stop of the engine 11 as the inrush voltage VS of the lead storage battery 13 is lower.

Suppose that the starter 14A is driven thereafter at timing T3 when the lead storage battery 13 is further discharged, as shown in FIG. 5. At this time, the internal resistance of the lead storage battery 13 in the state A is correspondingly higher than that at the time of the nearly full charge. Accordingly, as shown in FIG. 2, the inrush voltage VS3 when the engine 11 is started up at timing T3 is equal to or lower than the prohibition threshold VL1. In this case, in the temporary stop process of the engine 11, the engine control unit 50 prohibits the temporary stop of the engine 11.

Next, effects of the embodiment will be described. Depending on a use manner of the lead storage battery 13 and the like, in some cases, the lead storage battery 13 is actually degraded and the dischargeable capacity is small, although the value of the internal resistance is not much different from the internal resistance of the lead storage battery 13 that is not degraded in the state of the full charge. In this case, as shown by a broken line in FIG. 5, the lead storage battery 13 has a battery characteristic that the internal resistance is correspondingly low when the charge amount is near the full charge amount but the internal resistance drastically rises with the discharge. In the case where such a degradation occurs in the lead storage battery 13, the charge amount at the time of the full charge becomes smaller and therefore the degradation is more undesirable, compared to the degradations in the states A to C shown by the solid lines in FIG. 5. Such a degradation easily proceeds, when the lead storage battery 13 is discharged for a long time until the charge amount becomes small and thereafter the lead storage battery 13 is charged to an amount near the full charge amount, that is, when a long-time discharge and a long-time charge are repeated.

With the embodiment, the starter 14A is driven at the time of the start-up of the engine 11, and the consumed electric power of the in-vehicle equipment 14 other than the starter 14A is likely to be nearly constant. Even if the consumed electric power of the in-vehicle equipment 14 other than the starter 14A differs, the difference is correspondingly small compared to the consumed electric power of the starter 14A. Accordingly, by measuring the inrush voltage VS of the lead storage battery 13 when the starter 14A is driven, it is possible to eliminate influence of the consumed electric power of the in-vehicle equipment 14, and the like, and to appropriately determine the internal resistance of the lead storage battery 13. Then, when the internal resistance of the lead storage battery 13 is high due to the discharge or degradation of the lead storage battery 13, the discharge upper limit amount DL is set so as to be small, so that the period of the temporary stop of the engine 11 becomes relatively short. Accordingly, it is possible to secure an opportunity of the temporary stop of the engine 11, and therewith to restrain the over discharge of the lead storage battery 13 due to the temporary stop of the engine 11. As a result, the degradation of the lead storage battery 13 caused by the over discharge is restrained.

Particularly, when the over discharge of the lead storage battery 13 due to the temporary stop of the engine 11 is restrained, there is a high possibility that the charge is started before the discharge of the lead storage battery 13 continues for a long time, and therefore the progression of the degradation with the characteristic that the internal resistance drastically rises with the discharge as shown by the broken line in FIG. 5 is easily prevented. By preventing the degradation with the undesirable characteristic from occurring in the lead storage battery 13 in this way, it is possible to extend product life before the lead storage battery 13 cannot operate the in-vehicle equipment 14 or cannot drive the starter 14A.

With the embodiment, the discharge upper limit amount DL is set so as to be smaller as the inrush voltage VS is lower relative to the restraint threshold VL2. Therefore, as the dischargeable capacity of the lead storage battery 13 is smaller, the discharge upper limit amount DL of the lead storage battery 13 is set so as to be smaller, and the period of the temporary stop of the engine 11 becomes shorter. In this way, it is possible to change the limit of the discharge of the lead storage battery 13, depending on the internal resistance of the lead storage battery 13. As a result, for example, in the case where the dischargeable capacity becomes small due to the degradation of the lead storage battery 13, it is possible to restrict the dischargeable amount of the lead storage battery 13 depending on the degree of the degradation of the lead storage battery 13.

With the embodiment, when the inrush voltage VS is equal to or lower than the prohibition threshold VL1, the temporary stop of the engine 11 is prohibited. Therefore, when the internal resistance of the lead storage battery 13 is high due to the degradation of the lead storage battery 13 or the insufficiency of the charge, the drive of the engine 11 is continued, and the lead storage battery 13 is charged. Accordingly, it is possible to avoid a situation in which the temporary stop of the engine 11 is performed, but the lead storage battery 13 is excessively discharged during the temporary stop, so that the electric power necessary to start up the engine 11 again cannot be supplied to the starter 14A.

With the embodiment, the dischargeable capacity of the lead storage battery 13 in the period of the temporary stop of the lead storage battery 13 is larger as the charge-discharge current of the lead storage battery 13 during the drive of the engine 11 is greater to the charge side. Meanwhile, the dischargeable capacity of the lead storage battery 13 in the period of the temporary stop is smaller as the charge-discharge current of the lead storage battery 13 during the drive of the engine 11 is greater to the discharge side. Therefore, the period of the temporary stop of the engine 11 is appropriately managed, so as to reflect the charge-discharge capacity of the lead storage battery 13 during the drive of the engine 11.

The above embodiment can be carried out while being modified described below. The embodiment and the following modifications can be carried out while being combined in a range in which there is no technical inconsistency. The kind of the battery is not limited to the lead storage battery 13. A battery having at least one of a characteristic that the internal resistance becomes high as the charge amount SOC becomes small due to the discharge and a characteristic that the internal resistance becomes high as the charge amount SOC becomes small due to the degradation can be applied as the battery in the above embodiment.

The temporary stop condition for the engine 11 is not limited to the example of the above embodiment. For example, in addition to the conditions in the example of the above embodiment, a condition that a wiper is not being actuated, a condition that the operation amount of the brake pedal is not drastic, or the like may be adopted.

The discharge upper limit amount DL in the period of the temporary stop of the engine 11 may be set using a time. During the temporary stop of the engine 11, the discharge amount of the lead storage battery 13 is expected to increase with elapse of time, and therefore, there is no particular problem even when the discharge upper limit amount DL is set using an upper limit time of the temporary stop of the engine 11.

Without being limited to the example of the above embodiment, the discharge upper limit amount DL only needs to be set so as to be smaller when the inrush voltage VS is equal to or lower than the restraint threshold VL2, than when the inrush voltage VS is higher than the restraint threshold VL2. For example, the discharge upper limit amount DL may be set based on only the temperature of the lead storage battery 13 and the integrated value of the charge-discharge current measured by the battery sensor 21, without depending on the inrush voltage VS. Further, the discharge upper limit amount DL does not need to depend on the temperature of the lead storage battery 13 and the charge-discharge current measured by the battery sensor 21, and the inrush voltage VS may be set based on only the restraint threshold VL2. Furthermore, the discharge upper limit amount DL may be set to a fixed value that is smaller than the specified upper limit amount PL.

Instead of the prohibition process for the temporary stop of the engine 11 in step S13, the discharge upper limit amount may be set to zero in step S26. In this case, the engine control unit 50 does not perform the processes of step S12 and step S13 in the temporary stop process for the engine 11, and proceeds to step S23 after step S11. Then, in step S26, the engine control unit 50 may set the discharge upper limit amount DL to zero, when an amount by which the inrush voltage VS falls below the restraint threshold VL2 is correspondingly large, and thereby the temporary stop of the engine 11 may be prohibited.

The battery start-up voltage does not need to be the inrush voltage VS. For example, as shown in FIG. 2, when the starter 14A is driven, the inter-terminal voltage V of the lead storage battery 13 instantaneously drops to the inrush voltage VS. Thereafter, as a reaction thereof, the inter-terminal voltage V rises, but the inter-terminal voltage V decreases again, to a local minimum value. The local minimum value is defined as a cranking voltage VC when the starter 14A is cranking the engine 11. Then, the cranking voltage VC may be employed as the battery start-up voltage. Furthermore, for example, an average voltage after the inrush voltage VS and before the cranking voltage VC can be employed as the battery start-up voltage.

The battery sensor 21 is not limited to the example of the above embodiment. A voltage sensor that measures the inter-terminal voltage V of the lead storage battery 13, a current sensor that measures the current, and a temperature sensor that measures the temperature may be provided separately. It is only necessary to measure at least the inter-terminal voltage V of the lead storage battery 13.

In the above embodiment, the determination of the degradation of the lead storage battery 13 can be performed based on the difference in the inrush voltage VS. Specifically, the control device 30 is provided with a start-up voltage difference acquisition unit that acquires the inter-terminal voltage V when the engine 11 is started up. The start-up voltage difference acquisition unit stores the inrush voltage VS when the engine 11 is started up.

Further, the start-up voltage difference acquisition unit stores the inrush voltage VS, whenever the starter 14A is driven. Then, the start-up voltage difference acquisition unit stores at least two past inrush voltages VS in the order from the latest inrush voltage.

The start-up voltage difference acquisition unit sets the earlier one of the two past inrush voltages VS stored, as a first battery start-up voltage, and sets the later one as a second battery start-up voltage. Then, the start-up voltage difference acquisition unit calculates a voltage difference VD that is the absolute value of the difference between the two. That is, as shown in FIG. 2, the first battery start-up voltage is the inrush voltage VS1, and the second battery start-up voltage is the inrush voltage VS2. The voltage difference VD is the difference between the inrush voltage VS1 when the starter 14A is driven and the inrush voltage VS2 when the starter 14A is driven at a different timing from the timing when the inrush voltage VS1 is measured.

When the voltage difference VD acquired by the start-up voltage difference acquisition unit is equal to or larger than a preset specified value VDL, the engine control unit 50 determines that the degradation has occurred in the lead storage battery 13. When the degradation has occurred in the lead storage battery 13, the engine control unit 50 sets the discharge upper limit amount DL such that the discharge upper limit amount DL is smaller than when the degradation has not occurred. By a test or the like, the specified value VDL is previously set to a voltage difference allowing the detection of a voltage decrease due to the rise in the internal resistance when the rise speed of the internal resistance becomes high with the discharge of the lead storage battery 13 as a result of the degradation of the lead storage battery 13.

In this modification, the discharge upper limit amount DL can be suitably set particularly in the lead storage battery 13 having a degradation characteristic that the internal resistance drastically rises with the discharge although the difference in the internal resistance from the lead storage battery 13 that is not degraded is small at the time of the full charge, as shown by the broken line in FIG. 5.

What is claimed is:

1. A control device that is applied to a drive system for a vehicle,
the drive system including an engine as a drive source, a battery that is charged using the engine as a motive power source, a starter that starts up the engine by being driven by electric power from the battery, and a voltage sensor that measures a voltage of the battery, the control device comprising an engine control unit that:

temporarily stops the engine when a battery start-up voltage that is measured when the starter is driven, is in a predetermined voltage range, and when a preset temporary stop condition is satisfied in a state where the engine is being driven; and sets a discharge upper limit amount based on the battery start-up voltage, and an integrated current value of a charge-discharge current of the battery that has been integrated until the engine is temporarily stopped since the engine is started up, so that the discharge upper limit amount is directly proportional to the integrated current value, and the discharge upper limit amount is set to be smaller when the battery start-up voltage is equal to or lower than a preset threshold, than when the battery start-up voltage is higher than the threshold;

starts up the engine again when a discharge amount of the battery in a period of the temporary stop of the engine is larger than the discharge upper limit amount.

2. The control device according to claim 1, wherein the engine control unit sets the discharge upper limit amount, such that the discharge upper limit amount becomes smaller as the battery start-up voltage becomes lower.

3. The control device according to claim 1, wherein the engine control unit prohibits the temporary stop of the engine, when the battery start-up voltage is equal to or lower than a preset prohibition threshold that is a value lower than the threshold.

4. The control device according to claim 1, wherein:
the drive system includes a current sensor that measures the charge-discharge current of the battery; and
the engine control unit sets the discharge upper limit amount, such that the discharge upper limit amount becomes smaller as an integrated value of the charge-discharge current measured by the current sensor after completion of the start-up of the engine by the drive of the starter and before the temporary stop of the engine becomes greater.

5. A control device that is applied to a drive system for a vehicle, the drive system including an engine as a drive source, a battery that is charged using the engine as a motive power source, a starter that starts up the engine by being driven by electric power from the battery, and a voltage sensor that measures a voltage of the battery, the control device comprising an engine control unit that:

temporarily stops the engine when a battery start-up voltage that is measured when the starter is driven, is in a predetermined voltage range, and when a preset temporary stop condition is satisfied in a state where the engine is being driven;

sets a discharge upper limit amount based on a voltage difference between a first battery start-up voltage and a second battery start-up voltage, and an integrated current value of a charge-discharge current of the battery that has been integrated until the engine is temporarily stopped since the engine is started up, so that the discharge upper limit amount is directly proportional to the integrated current value, and the discharge upper limit amount is set to be smaller when the voltage difference is equal to or larger than a preset threshold, than when the voltage difference is smaller than the preset threshold; and starts up the engine again when a discharge amount of the battery in a period of the temporary stop of the engine is larger than the discharge upper limit amount, wherein the first battery start-up voltage is measured by the voltage sensor when the starter is driven, and the second battery start-up voltage is measured by the voltage sensor when the starter is driven at a different time from a time when the first battery start-up voltage is measured.

* * * * *